Feb. 13, 1923.

C. BORNMANN.
FINDER FOR FOLDING CAMERAS.
FILED JUNE 10, 1921.

Inventor
Carl Bornmann
By his Attorney
Phillips Abbott

Feb. 13, 1923.

C. BORNMANN.
FINDER FOR FOLDING CAMERAS.
FILED JUNE 10, 1921.

Inventor
Carl Bornmann
By his Attorney
Phillips Abbott

Patented Feb. 13, 1923.

1,445,198

UNITED STATES PATENT OFFICE.

CARL BORNMANN, OF BINGHAMTON, NEW YORK, ASSIGNOR TO ANSCO COMPANY, OF BINGHAMTON, NEW YORK, A CORPORATION OF NEW YORK.

FINDER FOR FOLDING CAMERAS.

Application filed June 10, 1921. Serial No. 476,397.

*To all whom it may concern:*

Be it known that I, CARL BORNMANN, a citizen of the United States, and a resident of the city of Binghamton, county of Broome, and State of New York, have invented a new and useful Improvement in Finders for Folding Cameras, of which the following is a description, reference being had to the accompanying drawings, in which like reference numerals indicate like parts.

It is the purpose of this invention to obviate a serious objection incident to the use of finders on folding cameras resulting from the fact that the necessary tilting of the finder in order that it may pass within the box of the camera has ordinarily been effected by permitting the finder to come in contact with the bellows during the operation of folding the camera and swinging up the drop front so that the pressure of the finder against the bellows may effect the desired tilting of the former, and this operation while effective for the purpose of moving the finder is very destructive of the bellows because since the folds of the bellows and the body of the finder are both slightly moving during the time they are pressed together by the retractile spring of the finder a hole is very soon worn through the folds of the bellows which, admitting light, of course destroys the further usefulness of the camera. Under my invention, therefore, I equip the camera and the finder with certain mechanical devices, about to be described, which, coacting together, positively ensure the proper and automatic tilting of the finder and prevent it from ever coming in contact with the bellows.

In the drawings—Figure 1 is a side elevation of the camera and finder in position for use.

Figure 1:
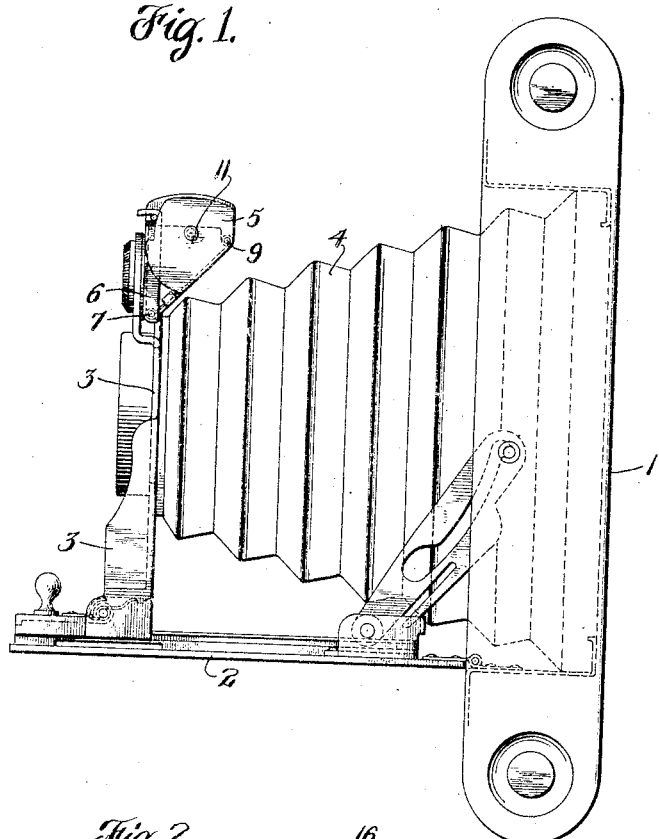
Figure 2:
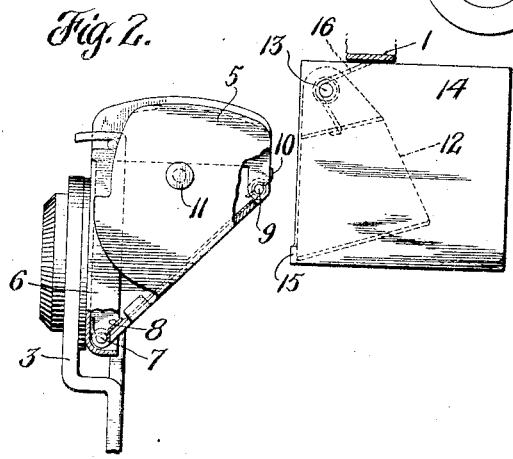
Figure 2, is a side elevation of the finder, parts being broken away to show the construction, which permits the tilting of the camera. In this figure also is shown in dotted lines the pivoted swing plate inside the camera which effects the tilting of the finder during the folding of the camera.

In the drawing 1 represents the box of the camera; 2 the drop front; 3 the sliding lens frame; 4 the bellows; 5 the finder; 6 the finder supporting frame; 7 the pivot upon which the finder tilts bodily provided with retractile spring 8, and 9 the pivot provided with retractile spring 10 upon which the top glass of the finder and its frame tilts.

Figure 5:
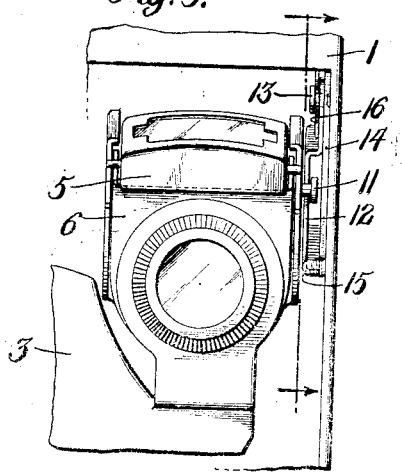
Figure 5, is a front elevation of the finder and coacting parts.
Figure 6:
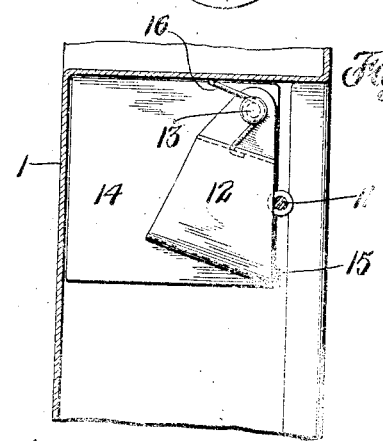
Figure 6, is a side elevation of the swinging plate; the opposite side of the camera being removed to expose the plate to view, and looking in the direction of the arrows in Figure 5.

Referring now to the parts more particularly involved in this invention, 11 is a stud preferably headed as shown to ensure its proper engagement with the edge of the swing plate on the camera, 12 is the swing plate. It may be pivoted as at 13, to the side of the camera, but preferably to a metallic plate 14, which is immovably attached to the side of the camera and which has an ear or projection 15 formed on its front edge which acts as a stop to determine the forward swing of the plate 12. I prefer to offset the plate 12 as shown best in Figure 5 so that the head of the stud 11 will engage behind the plate, thus interlocking therewith and be prevented from slipping away therefrom during the operation of the parts. 16 is a spring which preferably encircles the pivot of the swing plate and normally maintains the plate in its forward position. The tension of this spring is greater than that of the spring 8, but is such that it will yield and permit the finder to move entirely within the camera box and the bellows to be fully collapsed upon the application of sufficient pressure as, for instance, the upward movement of the drop front.

The operation is as follows. When it is desired to fold the camera the sliding lens frame carrying the finder with it is moved rearwardly collapsing the bellows until the stud 11 on the side of the finder comes in contact with the front edge of the swing plate 12, then the tension of the spring which controls the swing plate being greater than that of the spring 8 which controls the tilting of the finder, the result will be that the finder will be tilted forwardly, and prevented from coming in contact with the bellows. At this point the front board will be swung up and its movement will exert such added pressure upon the plate 12 through the stud 11 on the finder, that the tension of the spring 16 will be overcome and the plate 12 be swung rearwardly, thus completing the forward tilting of the finder and permitting all the parts including the bellows to pass fully within the camera and the drop front to be closed.

Figure 3:
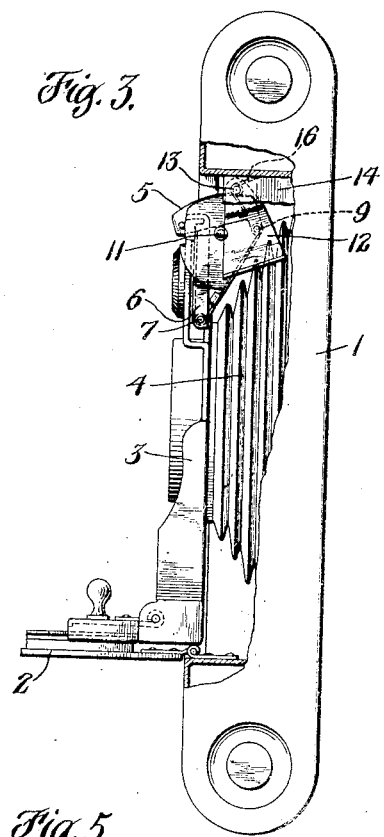
Figure 3, is a side elevation partly broken away showing the camera and the finder in the act of being folded.
Figure 4:
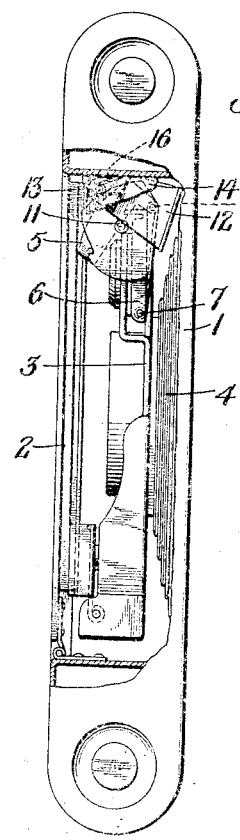
Figure 4, is a view similar to Figure 3 showing the camera fully folded and with front board closed.

It will be particularly noted, as clearly shown in Figures 3 and 4, that under my invention there is no contact whatever at any stage either of the opening or closing of the camera between the finder and the bellows or between the finder and any other part of the apparatus except the desired contact between the stud 11 and the edge of the swing plate. Thus the serious objection incident to such apparatus heretofore referred to is entirely eliminated.

It will be obvious to those who are familiar with such matters that the construction illustrated and described by me is one form only in which my invention may be embodied and that many alterations may be made therein and yet the essentials of my invention be retained. I, therefore, in no wise limit myself to the specific embodiment shown.

I claim,

1. In a folding camera including a camera box and bellows, the combination of a tilting finder and means on the camera box, independent of the bellows, to engage and tilt the finder during the folding operation before said finder makes contact with the bellows.

2. In a folding camera including a camera box and bellows, the combination of a tilting finder and tilting means therefor on the interior of the camera box so located as to engage and tilt said finder during the folding operation, before said finder makes contact with said bellows.

3. In a folding camera including a camera box and bellows, the combination of a tilting finder and a pivoted spring controlled tilting device located on the inside of said camera box which engages and tilts said finder during the folding operation independently of said bellows.

4. In a folding camera the combination of a tilting spring controlled finder, a pivoted and spring controlled device on the camera, the spring whereof has greater tension than that of the finder and means on the finder to engage the said device upon folding the camera.

5. In a folding camera including bellows and a spring controlled folding finder, an automatic finder folding device comprising a spring controlled plate pivoted to the camera, the spring thereof having greater tension than the finder spring, and means on the finder to engage said plate whereby upon the folding of the camera, said finder will be folded independently of said bellows.

6. In a folding camera an automatic finder folding device comprising a pivoted and spring controlled off-set device pivoted to the inside of a camera and a tilting finder provided with a headed projection adapted to engage the said device during the folding of the camera.

7. In a folding camera including bellows and a spring controlled folding finder, an automatic folding device comprising a spring controlled plate, the spring thereof having greater tension than the finder spring, and means on the finder to engage said plate whereby upon the folding of the camera said finder will be folded independently of said bellows.

CARL BORNMANN.